United States Patent
Campbell et al.

(10) Patent No.: US 8,215,886 B2
(45) Date of Patent: Jul. 10, 2012

(54) COUPLER BOLT TERMINATION SYSTEM

(76) Inventors: Richard V. Campbell, Tallahassee, FL (US); Kevin J. Barefield, Opelika, AL (US)

(*) Notice: Subject to any disclaimer, the term of this patent is extended or adjusted under 35 U.S.C. 154(b) by 258 days.

(21) Appl. No.: 12/589,609

(22) Filed: Oct. 26, 2009

(65) Prior Publication Data

US 2010/0104377 A1 Apr. 29, 2010

Related U.S. Application Data

(60) Provisional application No. 61/197,264, filed on Oct. 24, 2008.

(51) Int. Cl.
*F16B 35/06* (2006.01)

(52) U.S. Cl. ............ 411/401; 411/383

(58) Field of Classification Search ............ 411/396, 411/388, 389, 383, 401; 403/299, 300, 306, 403/307, 314, 374.4; 405/259.5
See application file for complete search history.

(56) References Cited

U.S. PATENT DOCUMENTS

| | | | | |
|---|---|---|---|---|
| 1,251,464 A * | 1/1918 | Becker | | 403/182 |
| 1,432,243 A * | 10/1922 | Harris | | 411/133 |
| 1,979,304 A * | 11/1934 | Anderson | | 403/44 |
| 1,984,026 A * | 12/1934 | Little | | 403/44 |
| 3,085,306 A * | 4/1963 | Drysdale | | 403/44 |
| 3,920,340 A * | 11/1975 | Jones et al. | | 403/306 |
| 4,652,166 A * | 3/1987 | Gautron | | 403/41 |
| 5,513,923 A * | 5/1996 | Schoepke et al. | | 403/301 |
| 5,868,554 A * | 2/1999 | Giacomino et al. | | 417/56 |
| 7,581,909 B2 * | 9/2009 | Szoke | | 411/401 |
| 2006/0160435 A1 * | 7/2006 | Campbell et al. | | 439/878 |

* cited by examiner

*Primary Examiner* — Victor Batson
*Assistant Examiner* — Roberta Delisle
(74) *Attorney, Agent, or Firm* — John Wiley Horton

(57) ABSTRACT

A termination system which attaches a conventional threaded rod or bolt to a cable. An anchor is attached to an end of a cable using known techniques—such as potting. A threaded rod or bolt is placed on the anchor, pointing away from the direction of the cable. The rod or bolt is mechanically attached to the anchor using several different techniques. The result is an anchor assembly including a threaded protruding shaft. Because the assembly uses an inexpensive prior art rod or bolt, the machining operations are confined to small components needing relatively little material removal.

5 Claims, 20 Drawing Sheets

COUPLER BOLT TERMINATION SYSTEM

CROSS-REFERENCES TO RELATED APPLICATIONS

This application claims the benefit, pursuant to 37 C.F.R. §1.53(c), of an earlier-filed provisional application. The earlier-filed provisional application listed the same inventors and was assigned Ser. No. 61/197,264 filed Oct. 24, 2008.

STATEMENT REGARDING FEDERALLY SPONSORED RESEARCH OR DEVELOPMENT

Not Applicable.

MICROFICHE APPENDIX

Not Applicable

BACKGROUND OF THE INVENTION

1. Field of the Invention

This invention relates to the field of cables. More specifically, the invention comprises a system for attaching conventional bolts or threaded rods to an end of a cable.

2. Description of the Related Art

Devices for mounting a termination on the end of a wire, rope, or cable are disclosed in U.S. Pat. No. 7,237,336, which is incorporated herein by reference.

The individual components of a cable are known by various terms, such as "fibers," "wires," or "strands." The nomenclature used often depends on the material used—such as steel "wire," hemp "fibers," or Kevlar "strands." This invention disclosed herein can be applied to virtually any type of cable assembly, though its main application is for use with synthetic cables. For purposes of uniformity, the individual components of the cables described will be referred to as "strands" throughout this application.

Some type of fitting must typically be added to a cable in order to transmit a load to the cable. One of the most common methods of attaching a fitting is by potting. FIG. 1 shows anchor 18 attached to an end of cable 10 (Only a small length of the cable is shown, though it is typically much longer). FIG. 2 shows the same combination sectioned in half to show internal features. Anchor 18 can be attached to the strands of the synthetic cable by a variety of techniques. The version shown is attached by potting a length of strands into an expanding central cavity through the anchor.

The term "potting"—which is well known to those skilled in the art—can be described as follows: The cable strands are typically splayed into a diverging pattern and infused with liquid potting compound (using a variety of known techniques). The liquid potting compound is any substance which transitions from a liquid to a solid over time. The most common example would be a cross-linking adhesive such as an epoxy. Those skilled in the art know that such adhesives use two separate liquids which cross-link when mixed together. Such a liquid is mixed just prior to wetting the strands.

The wetted strands are at some point placed in tapered cavity 34 within anchor 18 (in some cases prior to wetting and in some cases after wetting), so that when the liquid potting compound hardens the strands will be locked to the anchor. The anchor and the portion of cable locked therein are then collectively referred to as a termination.

Potted region 44 consists of strands locked within the solidified potting compound. The anchor is thereby attached to the cable. The anchor has a first end which is approximately even with the end of the cable and a second end proximate to the cable but distal to the end of the cable (the lower end in the orientation shown in the view).

The termination of FIG. 2 is an effective attachment of an anchor to a synthetic cable. Other attachment methods are well known, including "spike and cone" fittings, compression fittings, knot anchorages, and splice anchorages. The present invention could be used with any of these prior art techniques. Because potting is the most common, it is the attachment method shown in most of the drawings. The actual invention is not dependent upon how the anchor is attached to the cable, however. Thus, most of the methods for creating such an attachment are not shown.

It is often desirable for a cable termination to include a long threaded rod. If such a rod is locked into another fitting, then a nut placed on the threaded rod can be used to draw the cable taut and apply a controlled amount of tension. However, as most anchors are made by machining, incorporating a threaded rod requires substantial material removal and finishing operations. On the other hand, separate standard threaded rods and bolts are quite cheap. If one can provide an anchor which can capture a conventional threaded rod or bolt in order to include a threaded attachment, substantial savings will result.

BRIEF SUMMARY OF THE PRESENT INVENTION

The present invention comprises a termination system which attaches a conventional threaded rod or bolt to a cable. An anchor is attached to an end of a cable using known techniques—such as potting. A threaded rod or bolt is placed on the anchor, pointing away from the direction of the cable. The rod or bolt is mechanically attached to the anchor using a coupler. The result is an anchor assembly including a threaded protruding shaft. Because the assembly uses an inexpensive prior art rod or bolt, the machining operations are confined to small components needing relatively little material removal.

REFERENCE NUMERALS IN THE DRAWINGS

| 10 | cable | 18 | anchor |
|---|---|---|---|
| 20 | male thread | 22 | coupler |
| 24 | bolt | 26 | threaded shaft |
| 28 | head | 30 | hole |
| 32 | torsional flat | 34 | tapered cavity |
| 36 | spacer | 38 | internal cavity |
| 40 | female thread | 42 | head retaining hexagon |
| 44 | potted region | 46 | head retaining slot |
| 48 | anchor | 50 | female thread |
| 52 | retainer | 54 | threaded hole |
| 56 | male thread | 58 | anchor |
| 60 | conical spacer | 62 | hole |
| 64 | swaged region | 66 | sleeve coupler |
| 68 | female thread | 70 | end cap |
| 72 | coupler | 74 | female thread |
| 76 | hole | 78 | retaining wall |
| 80 | rotating retainer | 82 | hole |
| 84 | flat | 86 | head |
| 88 | journal | 90 | rotating retainer |
| 92 | pin recess | 94 | spike |
| 96 | threaded rod | 98 | jam nut |
| 100 | lock nut | 102 | retaining tab |
| 116 | cotter key | | |

DETAILED DESCRIPTION OF THE INVENTION

Figure 1:
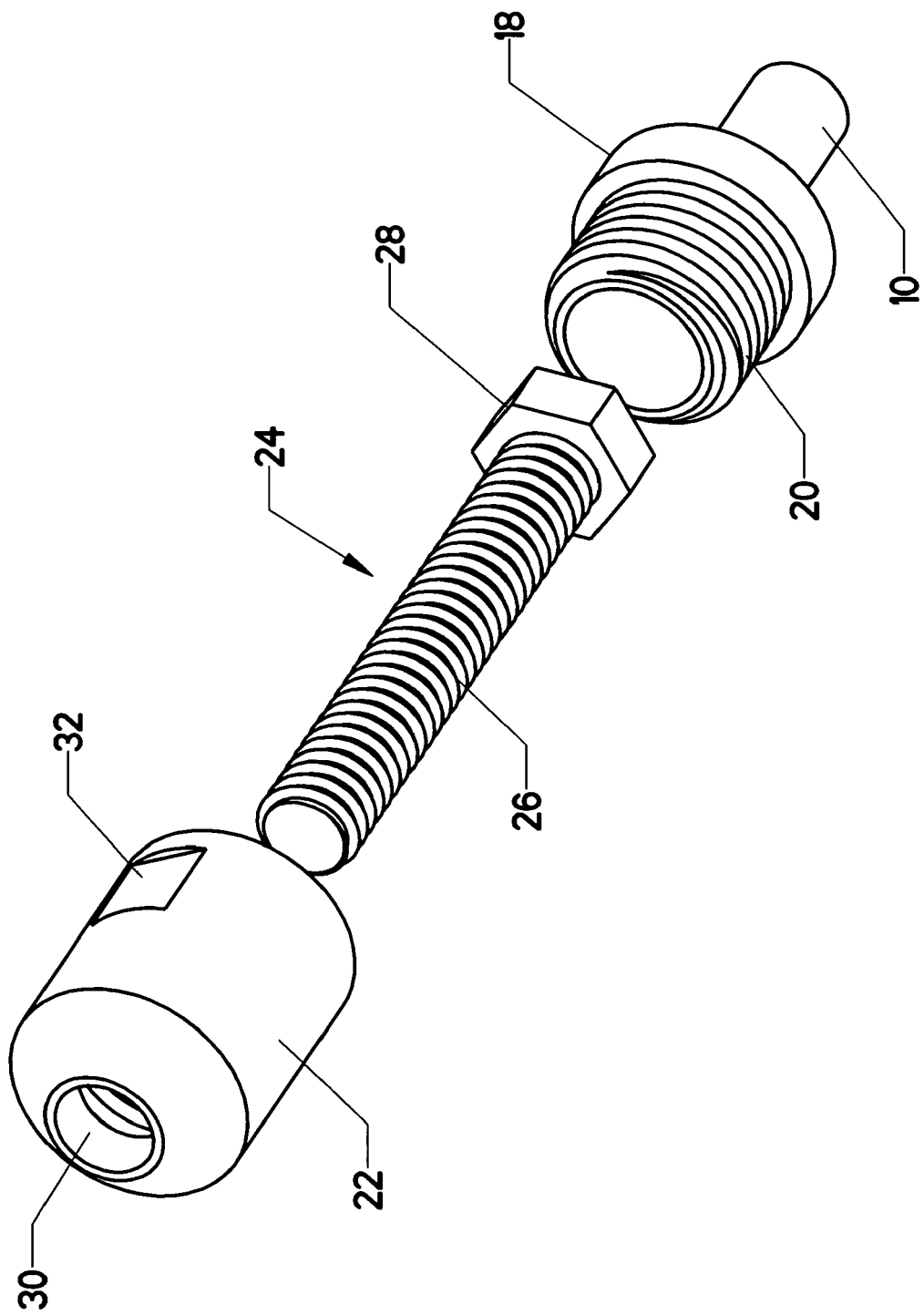
FIG. 1 is an exploded view showing the components used in one embodiment of the invention.
Figure 2:
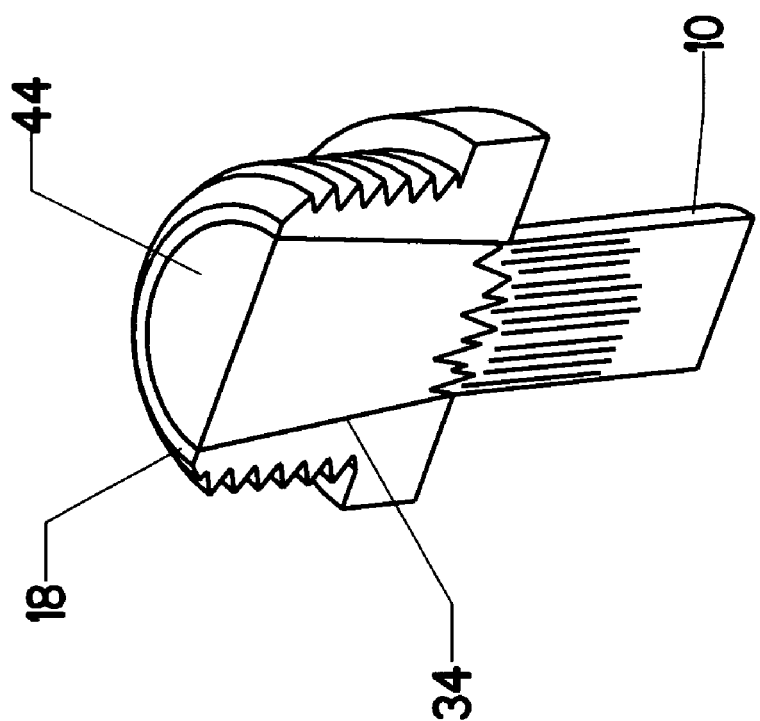
FIG. 2 is a sectioned perspective view, showing the interior of a potted termination.

FIG. 1 shows a prior art bolt 24 having a threaded shaft 26 and a head 28. The objective is to securely attach this bolt to anchor 18. Anchor 18 is provided with an attachment feature such as external male thread 20. Coupler 22 is provided with a corresponding attachment feature such as an internal female thread which can thread onto male thread 20. Coupler 22 also has hole 30, which is sized to admit threaded shaft 26. Two or more torsional flats 32 are preferably provided on the coupler's exterior surface. These allow a wrench to securely grip and turn coupler 22 in order to lock it onto anchor 18.

Figure 3:
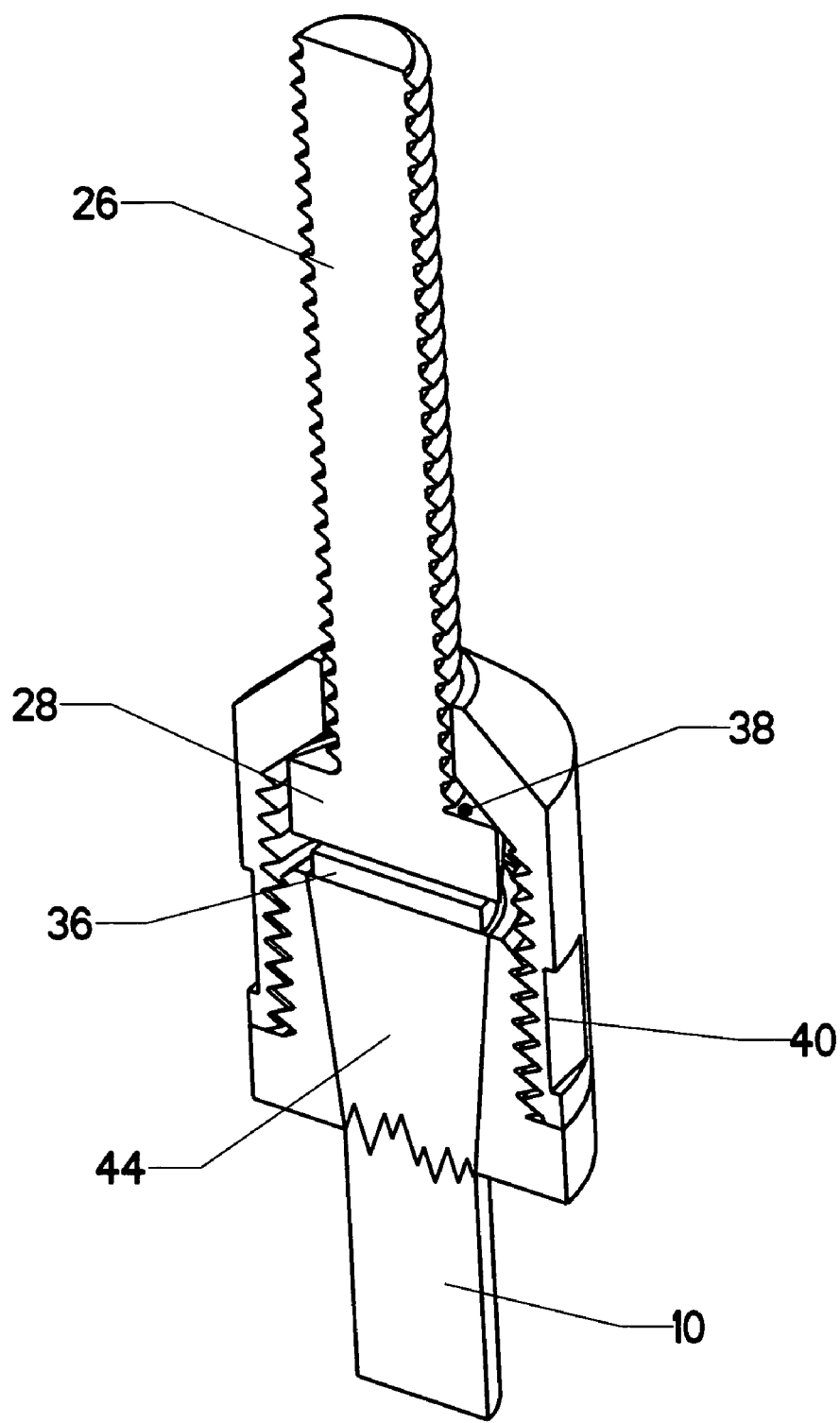
FIG. 3 is a sectioned perspective view, showing how a coupler is used to attach a bolt to an anchor.

FIG. 3 shows a sectional view of a completed assembly using these components. Threaded shaft 26 is passed through hole 30, so that head 28 lies within internal cavity 38. Coupler 22 is then threaded onto male thread 20 in order to capture the bolt head between the anchor and the coupler. Spacer 36 can be provided if desired. This component can be made of a compressible material—such as NYLON—so that its compression will tend to lock the coupler and the anchor together (much like a lock washer). On the other hand, if the spacer is omitted, the bolt can turn with respect to the anchor. This may be desirable, in that a torsional load placed on the bolt will not be transmitted through the anchor to the cable (or vice-versa).

For nearly all the variations shown in this disclosure, the bolt capturing hardware can be configured as a fixed or a swiveling system.

The reader will observe in FIG. 3 how the protruding threaded shaft has become an integral part of the completed termination. It can be engaged by an external component, such as by passing the shaft through a hole in a fixed bracket. A nut can then be threaded onto the shaft and tightened in order to apply tension to cable 10. Those skilled in the art will know that threaded shaft 26 could be formed as a part of coupler 22, such as by turning all of the features out of round stock on a lathe. However, forming the threaded shaft would require substantial material removal in its vicinity, thereby increasing cost. Capturing the prior art bolt eliminates this cost.

In addition, the use of the standard bolt allows the user to select a bolt of a desired length and type. The threaded shaft may be two inches long, ten inches long, or even longer. Such bolts are commercially available at attractive prices. The bolt may have a fully threaded shaft, or only a small threaded length—typically on its tip. It may also have a stepped-down threaded portion. Thus, using the coupler and modified anchor shown, the user can create a termination with a desired shaft length and type by simply selecting the right bolt.

The coupling of the bolt to the anchor also allows the user to select different materials for the different components. The cross section of the threaded shaft is typically the smallest tension-carrying cross-section. Thus, it may be desirable to select a high-strength steel for this portion (commercial bolts being available in a wide variety of steels). Coupler 22 often has a larger cross sectional area and can be made of a weaker material. Since it is typically turned on a lathe, it is desirable to select a free machining material as well. Aluminum may therefore be a good choice for this component.

Those skilled in the art will readily appreciate the advantage that this material selection flexibility affords. If the components were made as one integral piece, the material selection would be dictated by the strength needed in the smallest cross section. For many applications, this would mean that the entire part would have to be turned out of high strength steel—an expensive and time consuming process.

Figure 4:
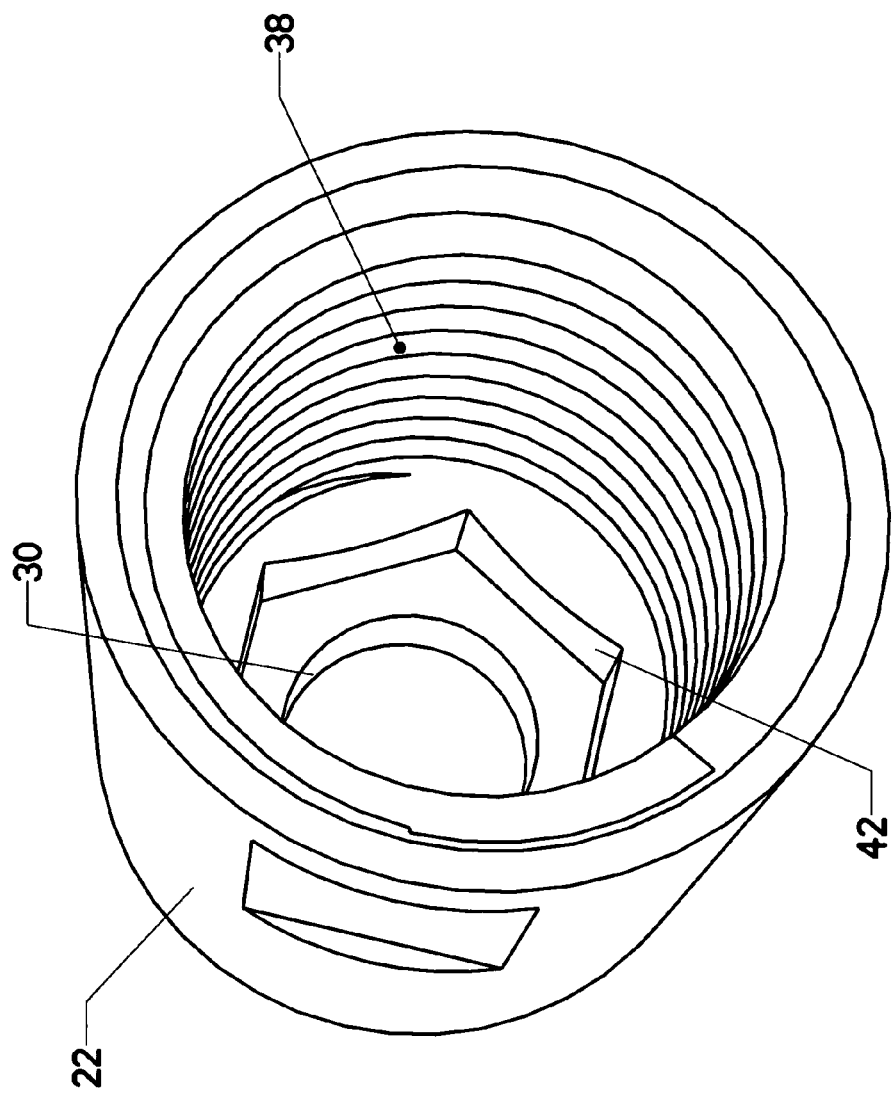
FIG. 4 is a perspective view, showing the interior of the coupler.

As mentioned previously, the connection between the bolt and the anchor may be fixed or allowed to swivel. Still looking at FIG. 3, the reader may perceive a problem with the swiveling option. As a nut is tightened on threaded shaft 26, bolt 24 may begin to turn. The user cannot arrest this turning, since the bolt head is hidden inside coupler 22. FIG. 4 shows one solution to this problem. Head retaining hexagon 42 is formed where hole 30 enters interior cavity 38. The bolt head drops into this recess, which surrounds the bolt head and prevents the bolt from turning.

Figure 5:
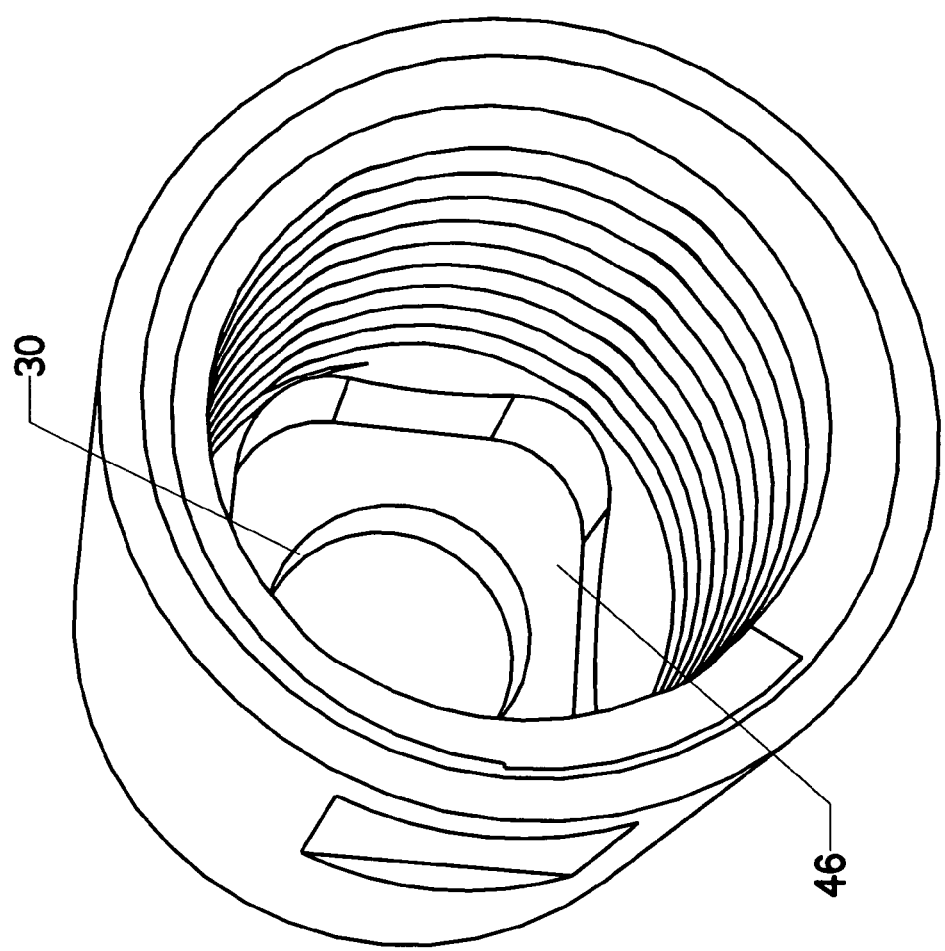
FIG. 5 is a perspective view, showing the interior of the coupler.

Other shapes can be used to secure the bolt head. FIG. 5 shows the inclusion of head retaining slot 46. This slot bears against only two of the bolt head's six hexagonal surfaces. It is sufficient to arrest the unwanted turning, however. It is also easier to machine than the hexagonal recess of FIG. 4. Other methods of arresting the turning of the bolt can be used. Examples include: (1) peening a small portion of the coupler against the bolt head; (2) Spot welding a portion of the bolt to the coupler; and (3) Gluing the bolt head to the coupler, such as by inverting the assembled bolt head and coupler and depositing liquid epoxy around the bolt head.

Having seen the general concept illustrated in FIGS. 1-5, those skilled in the art will realize that many different techniques can be used to capture a threaded rod or bolt. Additional embodiments are disclosed in FIGS. 6-19.

Figure 6:
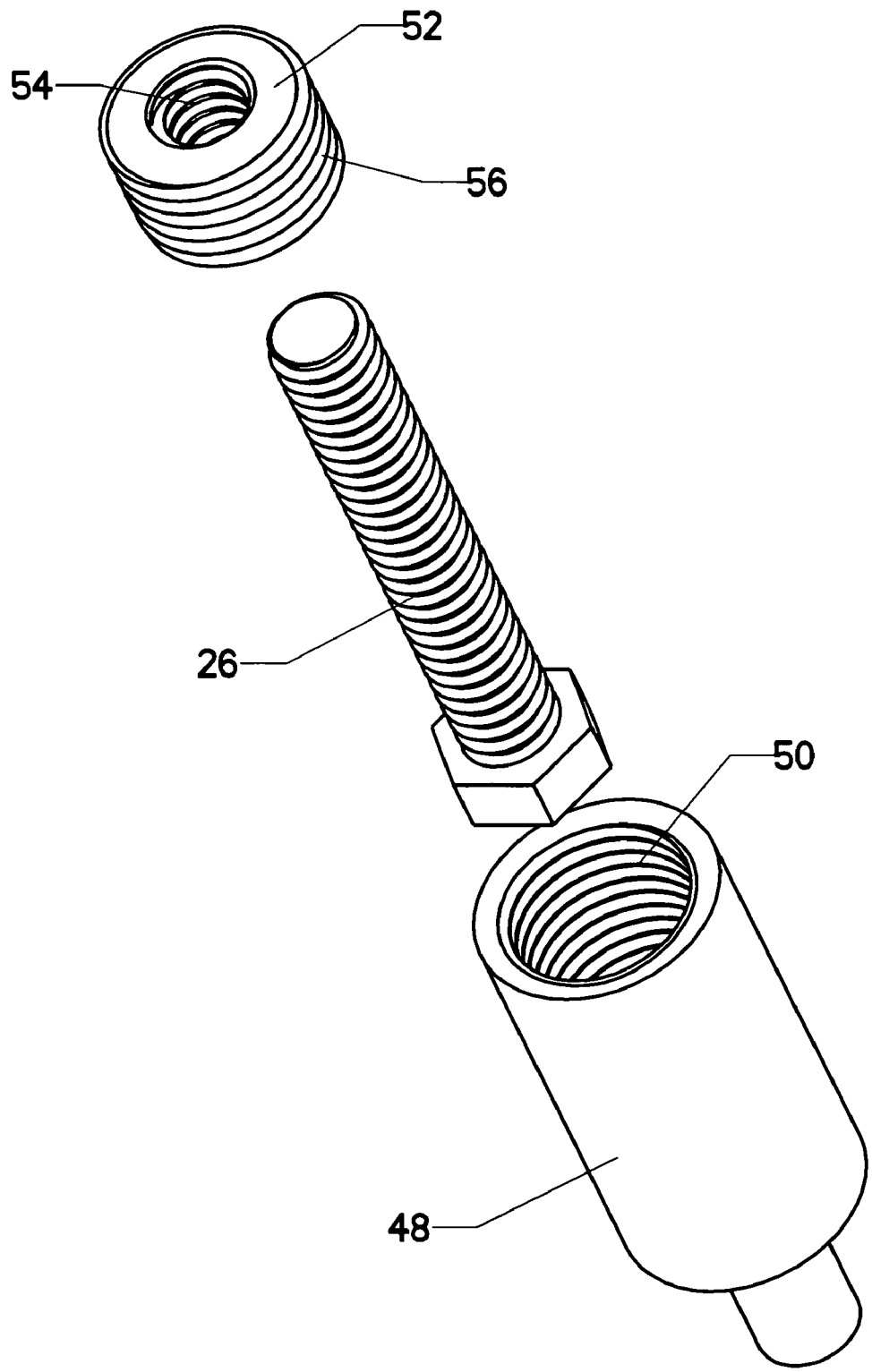
FIG. 6 is an exploded view showing the use of a threaded retainer.

FIG. 6 shows an embodiment using a separate retainer 52 as a coupler. Like the coupler shown in the preceding figures, it has a central hole. However, it locks to the anchor using an external thread rather than an internal one. Retainer 52 is a disk having an external male thread 56 and threaded hole 54. Anchor 48 is provided with female thread 50 (rather than the male thread shown in FIGS. 1-3). Threaded shaft 26 is threaded through threaded hole 54 to attach the bolt to retainer 52. Retainer 52 is then threaded into anchor 48. Thus, the reader will perceive how a coupler can be joined to an anchor using internal or external threads.

Figure 7:
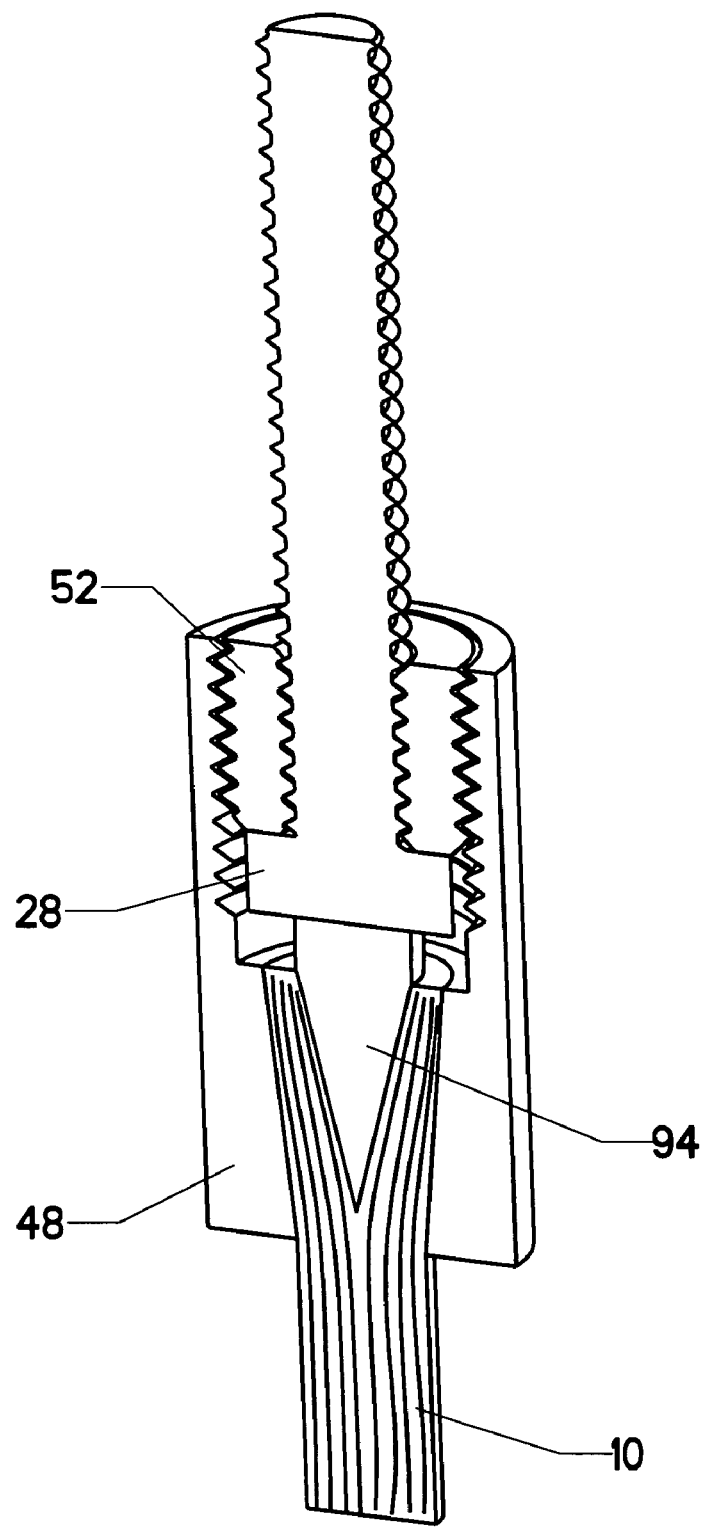
FIG. 7 is a sectioned perspective view, showing how a threaded retainer captures a bolt.

FIG. 7 is a sectional view of the completed assembly. The reader will observe how the bolt is captured in the completed termination. The reader will also note that this particular termination does not use potting to lock the cable strands within the anchor. Instead, it uses the "spike and cone" approach. As the assembly is threaded together, spike 94 compresses the cable strands against the conical sidewall of the passage through the anchor's interior. This locks the anchor to the cable.

The reader should also note that the spike can be made as a separate piece having a male thread, in which case it can be threaded into the anchor and locked in place before adding the bolt and retainer. Of course, retainer 52 could also be used with a potted anchor. In that case, the spike would not be needed.

Figure 7B:
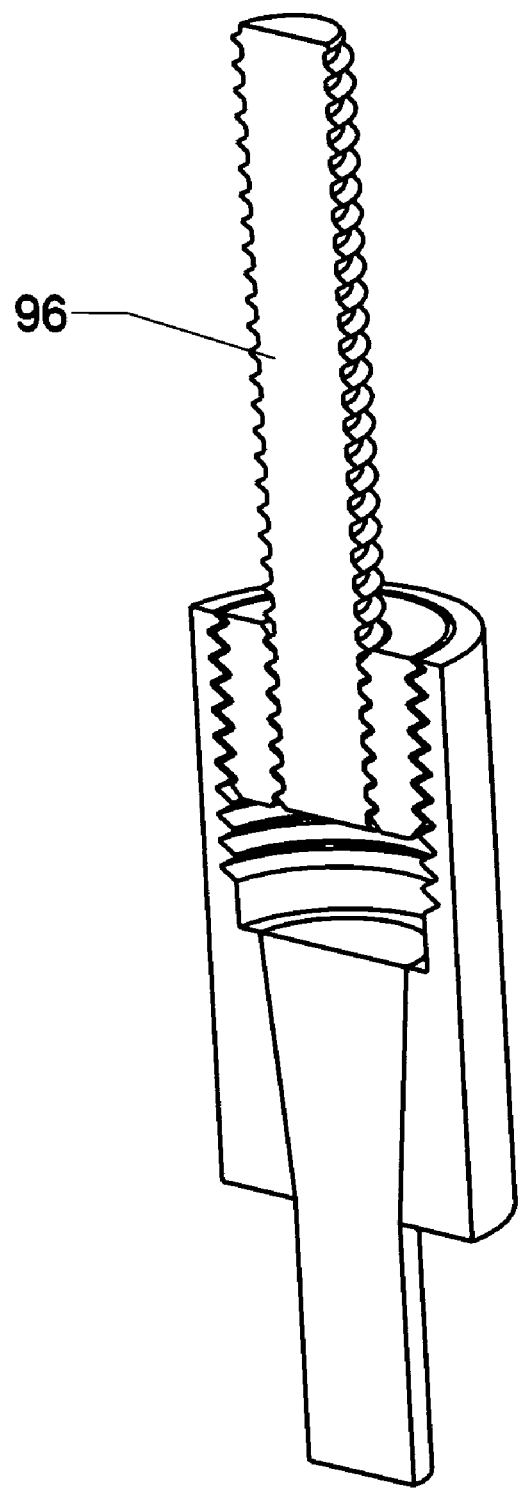
FIG. 7B is a sectioned perspective view, showing how a threaded retainer captures a threaded rod.

All of the components disclosed in the various embodiments can be configured for use with a threaded rod as opposed to a threaded bolt. FIG. 7B shows the use of retainer 52 to hold threaded rod 96 in position. It may be desirable to secure the threaded rod to the retainer so that the threaded rod does not turn when a nut is threaded onto the threaded rod. Locking the threads together can be accomplished using a set screw, a spot weld, a locking adhesive such as LOCTITE, or other known methods.

Figure 8:
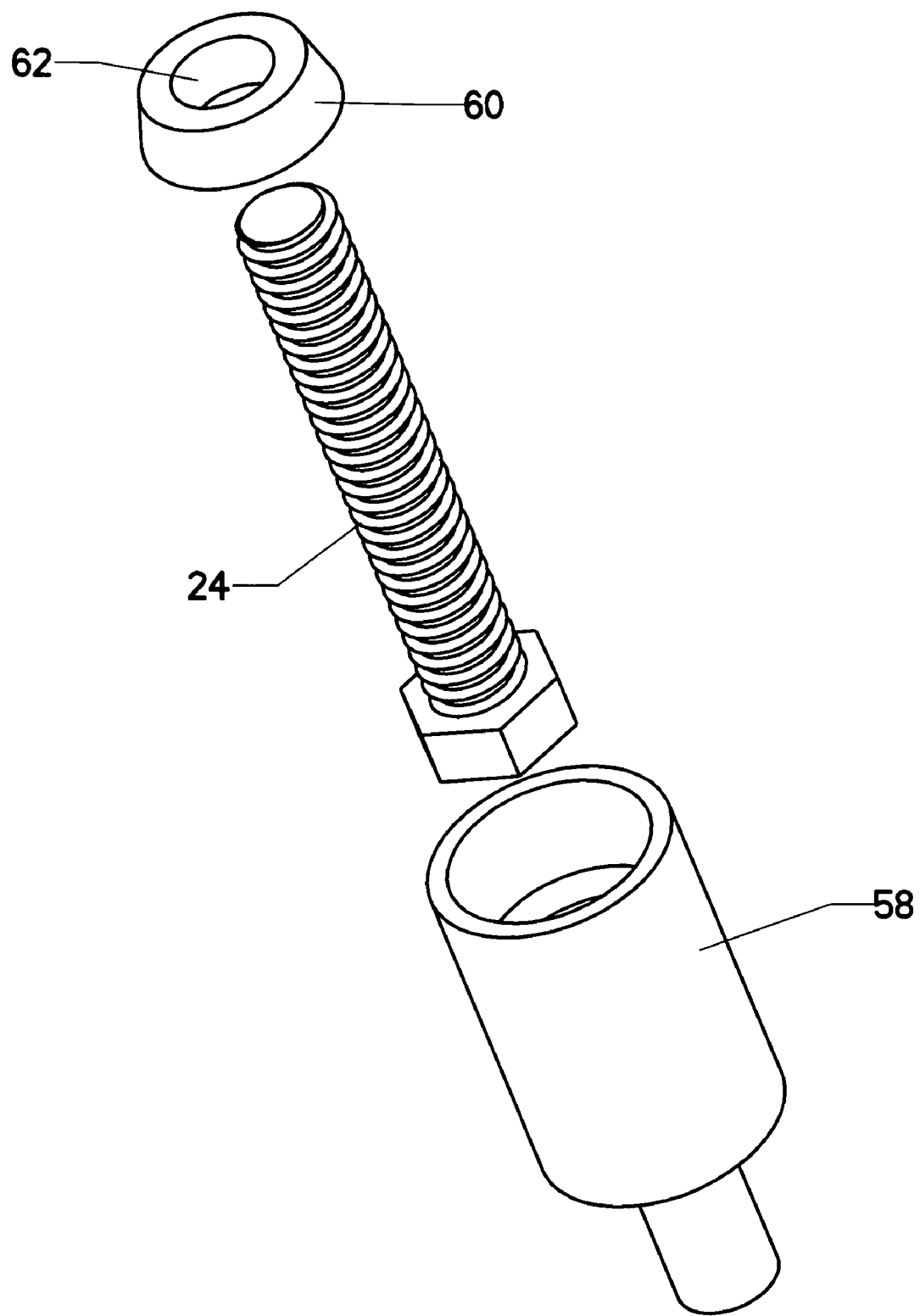
FIG. 8 is an exploded view, showing how a bolt can be captured using a swaging operation.

FIG. 8 shows another approach to capturing a bolt. In this embodiment, the coupler takes the form of conical spacer 60. It has the same central hole as the coupler embodiments shown in FIGS. 1 and 6. Its exterior surface preferably assumes the form of a truncated cone.

Figure 9:
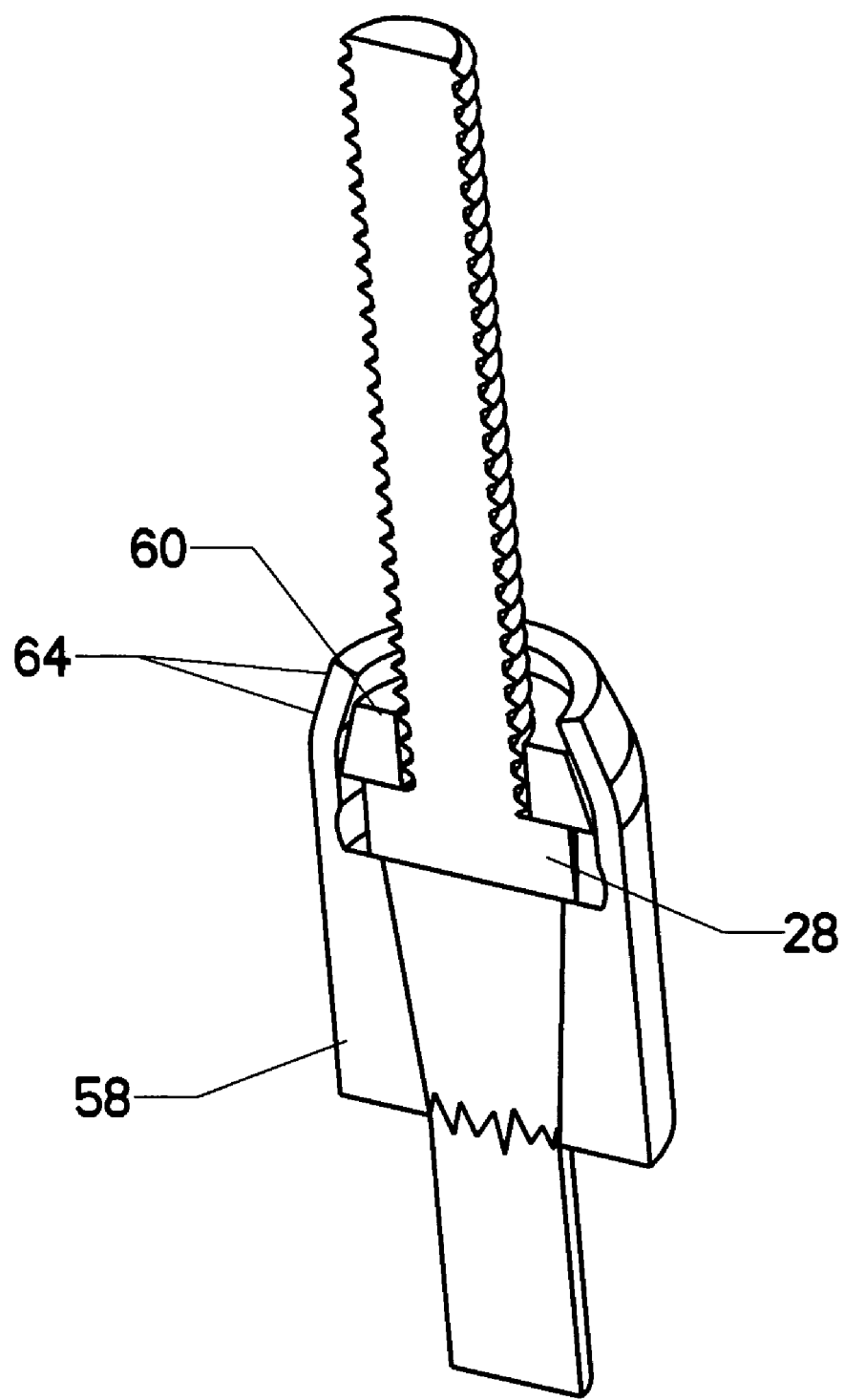
FIG. 9 is a sectioned perspective view, showing the result of a swaging operation.

Anchor 58 is provided with an open upper end. Bolt 24 is placed into this open end. Conical spacer 60—having central hole 62—can be placed over the bolt in order to hold it near the middle of anchor 58. The upper portion of anchor 58 is then swaged over the bolt head and conical spacer. FIG. 9 is a sectional view of the result. Swaged region 64 mechanically traps the bolt in position. The same approach can be taken for a threaded rod. In that case, the swage creates a necked-down section which is compressed into the threads of the threaded rod.

Figure 10:
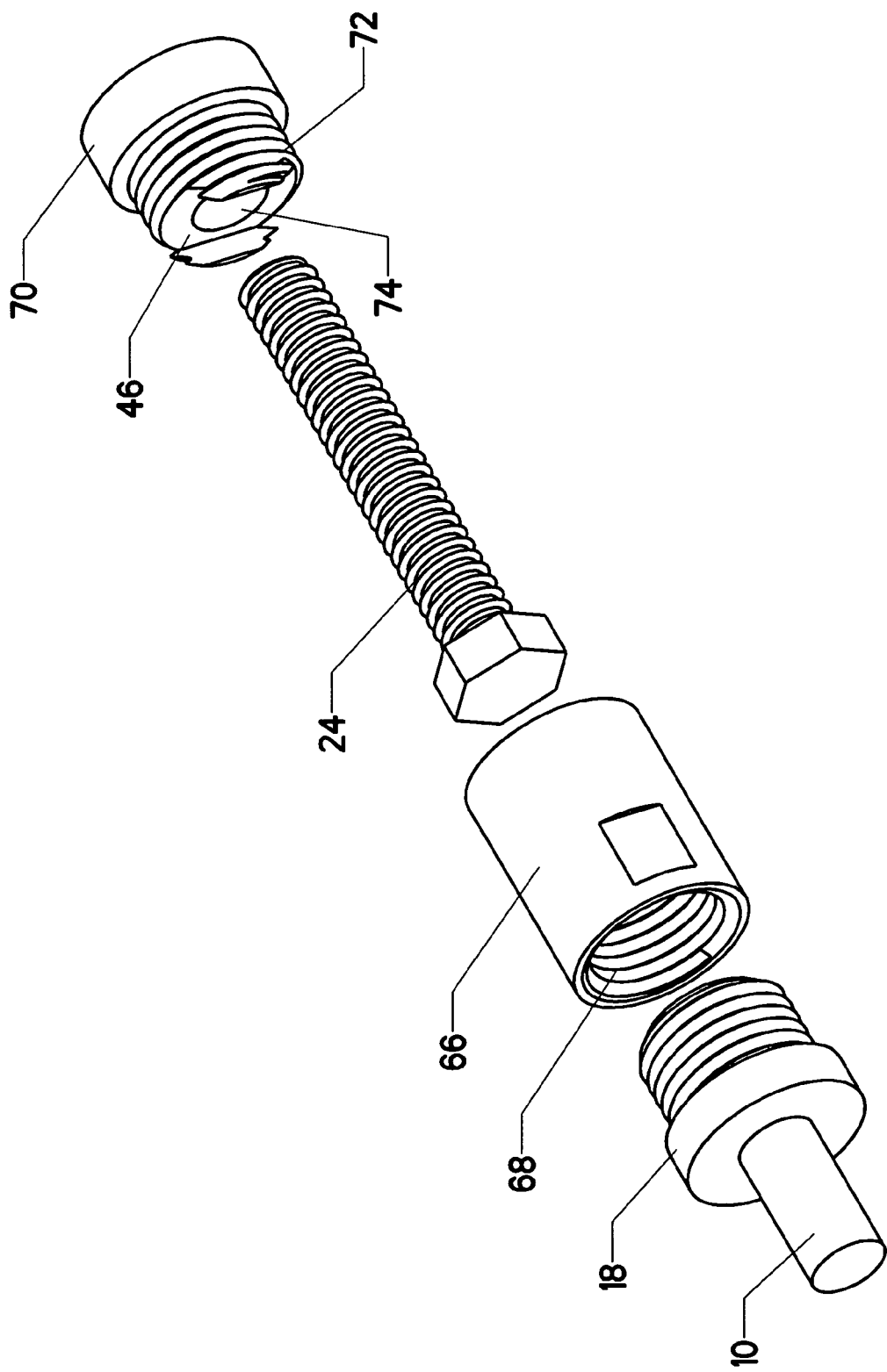
FIG. 10 is an exploded view, showing the use of an end cap.

Still another embodiment is shown in FIG. 10. In this embodiment, the coupler is split into two separate portions—denoted as sleeve coupler 66 and end cap 70. Bolt 24 is placed through hole 74 in end cap 70. End cap 70 optionally features head retaining slot 46 (or a similar feature) to capture the bolt head and prevent the bolt from turning with respect to the end cap.

Figure 11:
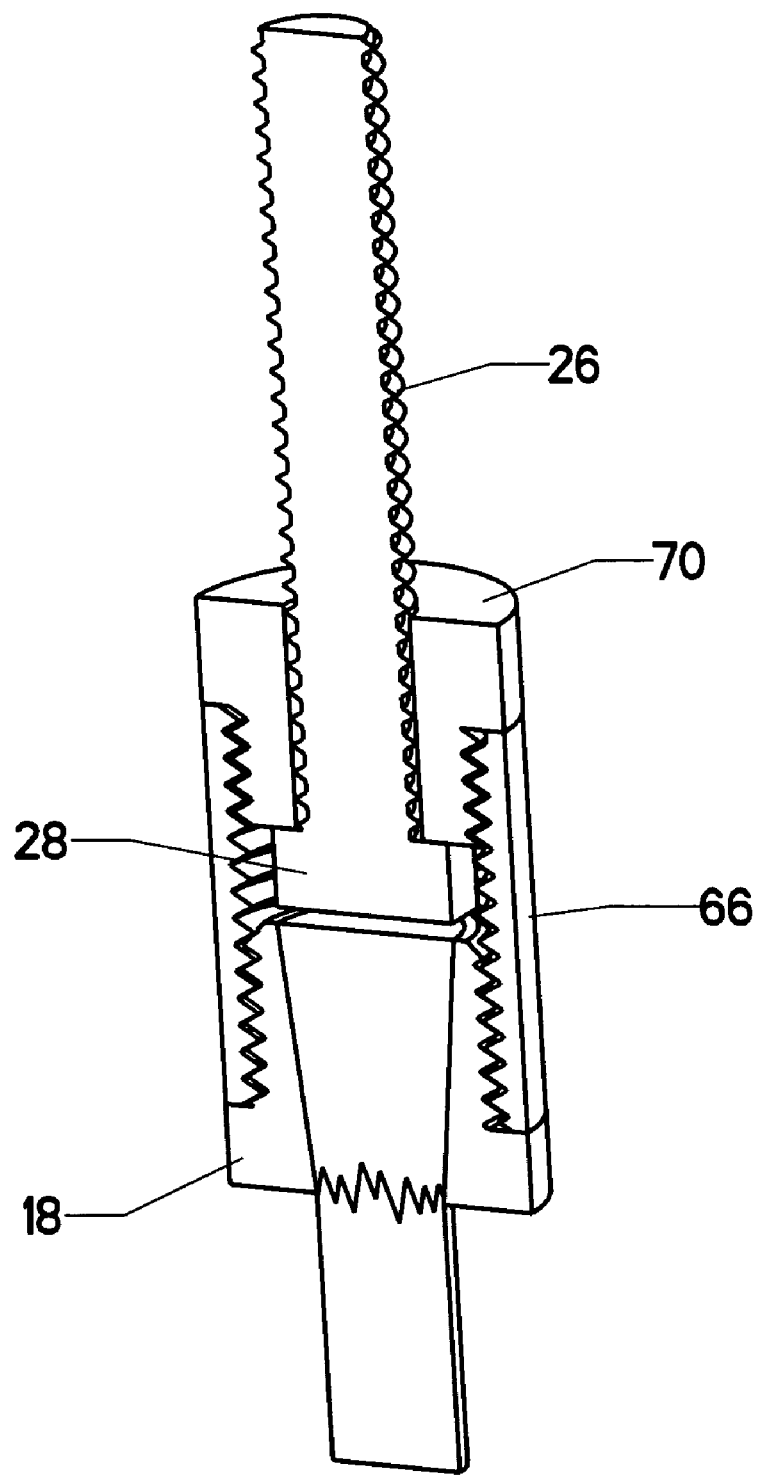
FIG. 11 is a sectioned perspective view, showing the use of an end cap.

End cap 70 is provided with male thread 72, which is sized to thread into female thread 68 on sleeve coupler 66. This threaded engagement is used to lock the end cap and the sleeve coupler together. Female thread 68 also allows sleeve coupler 66 to thread onto anchor 18. FIG. 11 is a sectional view of the completed assembly. The sleeve coupler has locked the anchor and end cap together, thereby attaching the bolt to the completed termination. The same type of configuration can be used for a threaded shaft. In that case, hole 74 will be provided with a female thread sized to engage the threaded shaft (similar to the engagement shown in FIG. 7B).

Figure 12:
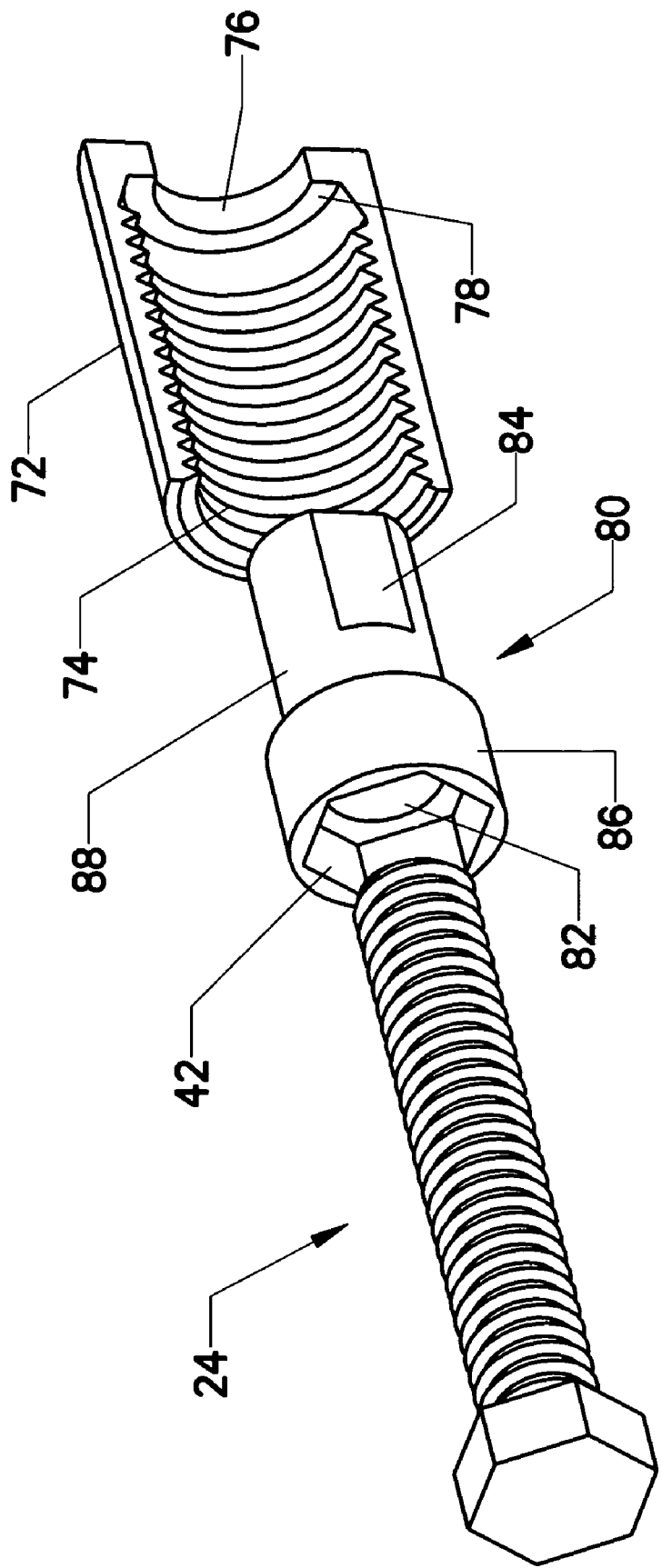
FIG. 12 is a sectioned perspective view, showing the use of a rotating retainer.

Returning briefly to FIGS. 3 and 4, the reader will recall that it is often desirable to prevent bolt 24 from turning with respect to a nut being threaded onto the bolt. FIG. 4 illustrates how a head retaining recess can prevent the unwanted turning. Other approaches are available as well. FIG. 12 illustrates one of these.

In FIG. 12, the coupler is again split into two separate pieces. A separate rotating retainer 80 takes the place of the end cap illustrated in FIGS. 10 and 11. This component includes head 86 and journal 88. Hole 76 in coupler 72 is sized to receive journal 88. Head 86 includes a head retaining hexagon 42 (or similar head retaining feature). Hole 82 passes all the way through the rotating retainer. Two or more flats 84 are provided so that a wrench can engage the rotating retainer.

Figure 13:
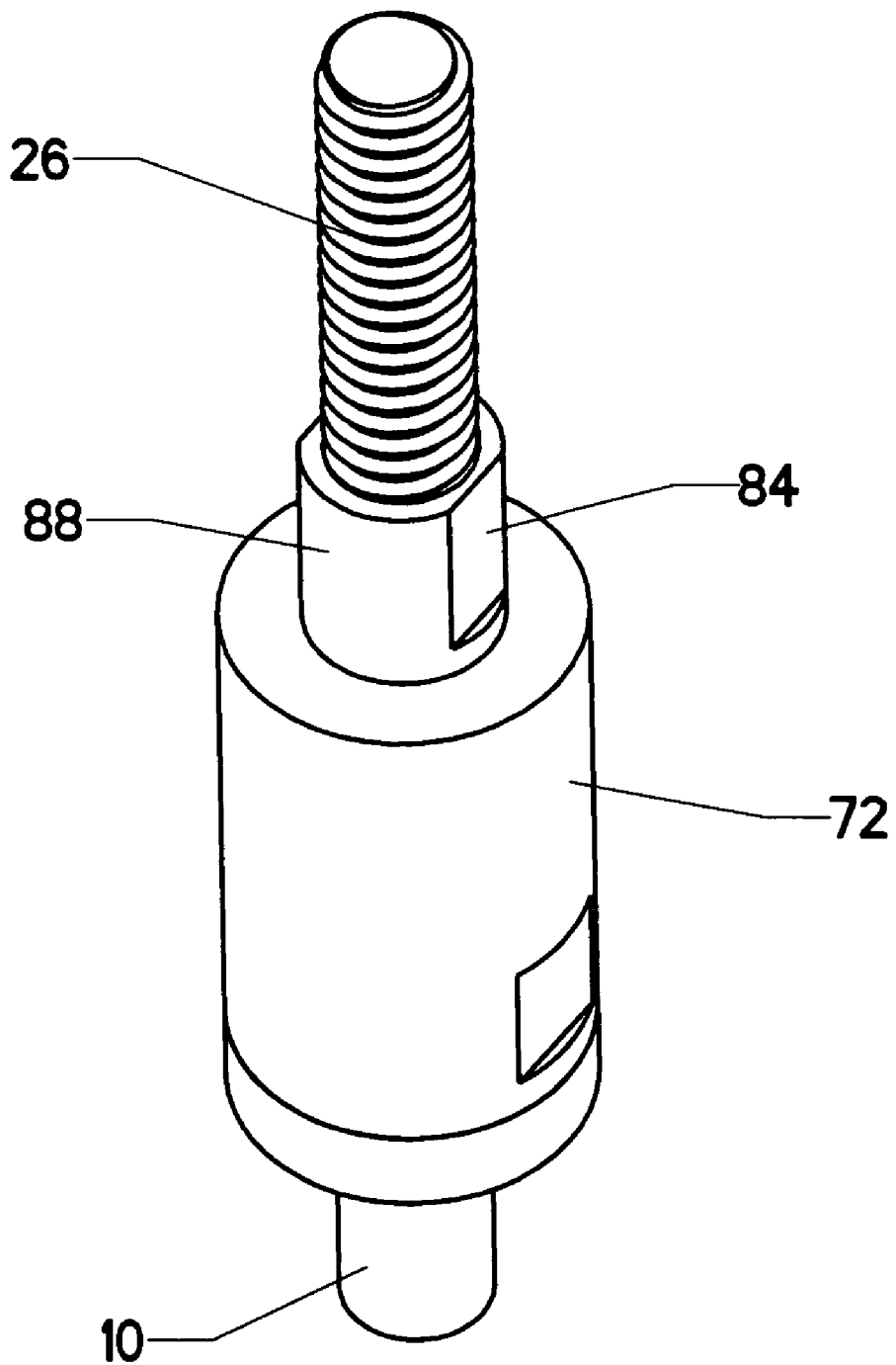
FIG. 13 is a perspective view, showing a completed assembly using a rotating retainer.

Bolt 24 is placed within rotating retainer 80, which is then placed within coupler 72 (head 86 bearing against retaining wall 78). Female thread 74 of coupler 72 is then threaded onto an anchor 18 such as the one shown in FIG. 11. The result is shown in FIG. 13. Journal 88 protrudes out the end of coupler 72. A wrench can engage the flats on the journal to prevent its rotation while a nut is threaded onto the exposed threaded shaft. However, rotating retainer 80 is still free to rotate with respect to the anchor and coupler. This can be desirable in those instances where one does not wish to transmit a torsional load on a cable to the cable's anchoring point. Lubrication ports can be provided to periodically lubricate the rotating joint. The reader should bear in mind that the length of threaded shaft 26 can be much longer than is shown in FIG. 13.

Figure 14:
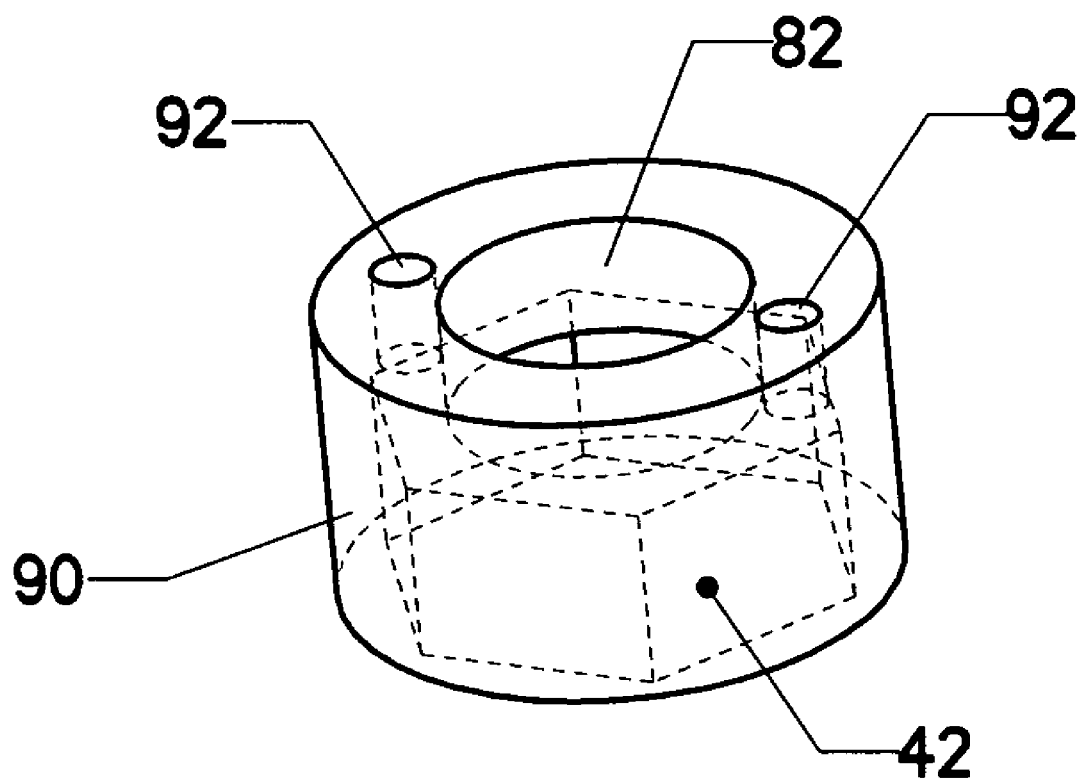
FIG. 14 is a perspective view, showing an alternate type of rotating retainer.
Figure 15:
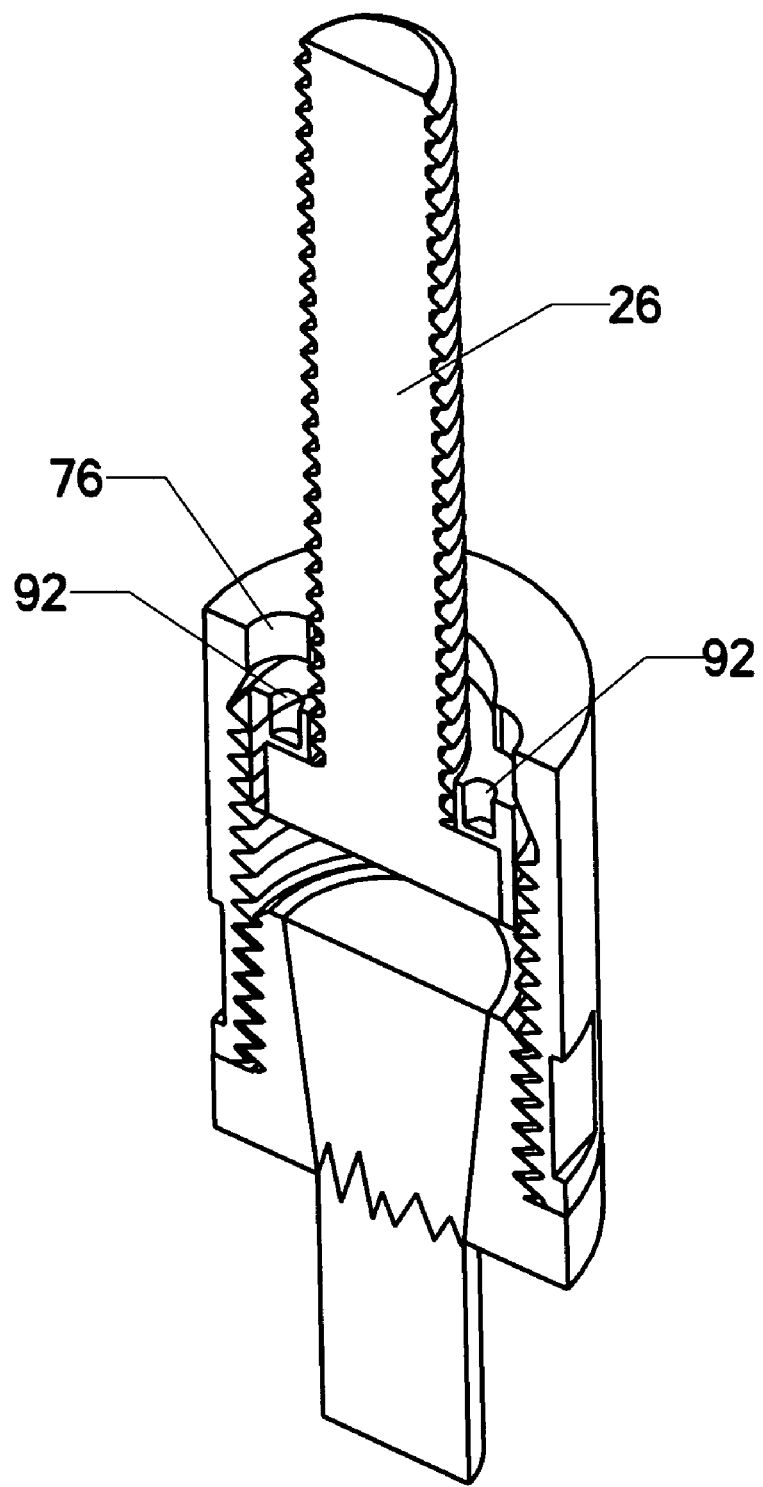
FIG. 15 is a section view, showing the alternate rotating retainer installed.

Other types of rotating joints can be used. FIG. 14 shows rotating retainer 90. It includes a hole 82, a bolt head locking feature (such as head retaining hexagon 42), and one or more pin recesses 92. FIG. 15 shows a sectional view of the device installed in a coupler. Hole 76 is made large enough to expose pin recess 92. A pin wrench can then be used to arrest the rotation of rotating anchor 90 while a nut is installed on the threaded shaft. Once the threaded shaft is connected (and the pin wrench removed), rotating retainer 90 then forms a rotary joint between the bolt and the coupler.

Figure 16:
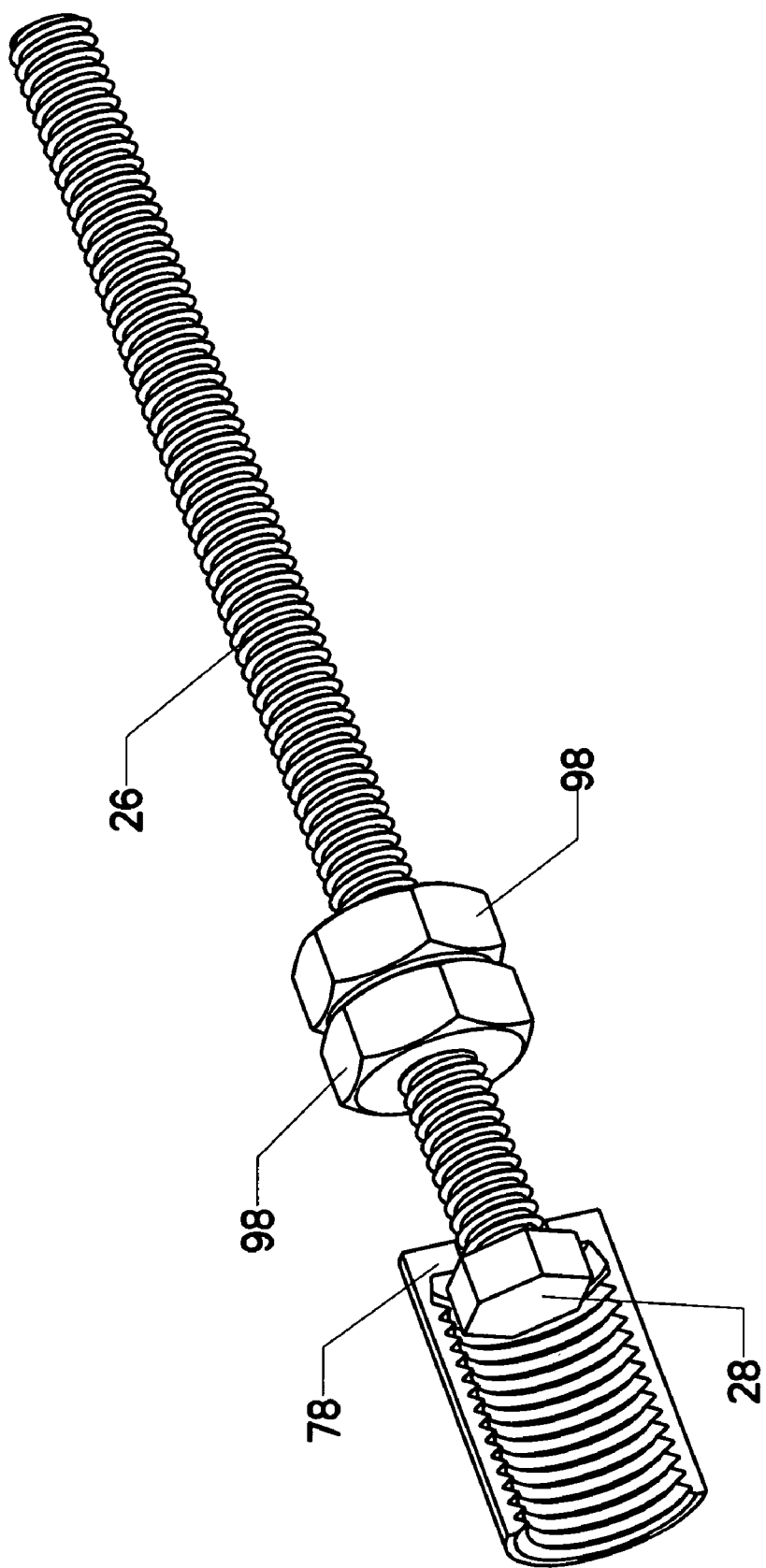
FIG. 16 is a sectioned perspective view, showing the use of two jam nuts.

Simpler methods of arresting the unwanted rotation can be employed. FIG. 16 shows a threaded coupler capturing a very long bolt (The threaded coupler is threaded onto an anchor for attaching the assembly to a cable, as shown in FIG. 13). Two jam nuts 98 are threaded onto threaded shaft 26 and torqued together. A wrench can be applied to the jam nuts to hold the threaded shaft while its free end is attached to some other device.

Figure 17:
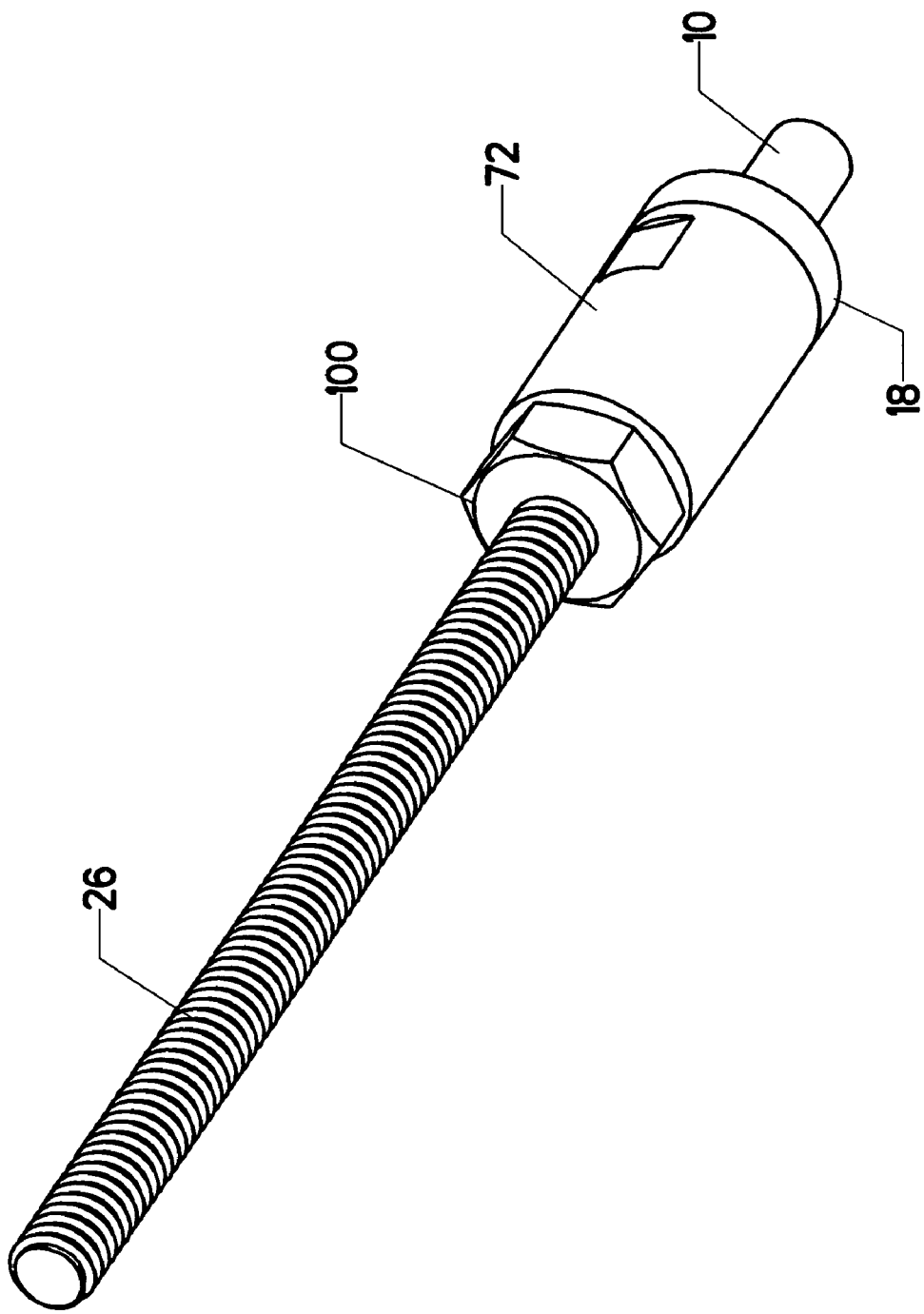
FIG. 17 is a perspective view, showing the use of a single lock nut.

The same bolt and threaded coupler assembly is shown in FIG. 17. In this view, a single lock nut 100 has been threaded down to the threaded coupler and locked against its external surface. Even a single lock nut can prevent unwanted rotation of threaded shaft 26 (though its torque-resisting ability is obviously limited). If gripping flats are present on the threaded coupler—as shown in the embodiment of FIG. 17—then the single lock nut can be tightened considerably. Many other torque-resisting features are known to those skilled in the art. As one example, wrench flats could simply be milled into the external thread of a commercially available bolt. Other known gripping features—such as thread-locking adhesive—could also be used.

Figure 18:
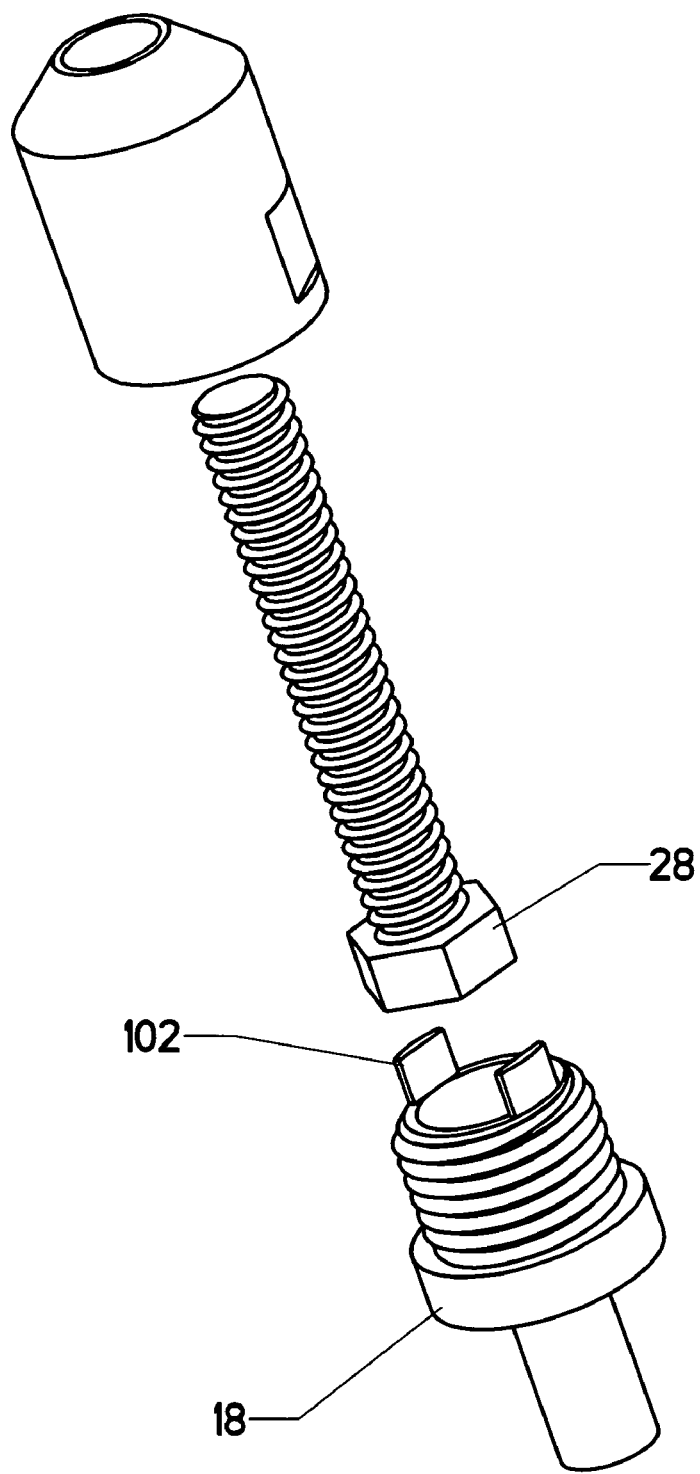
FIG. 18 is a perspective view, showing the use of retaining tabs on the anchor.

FIG. 18 shows an embodiment in which a feature is added to the anchor to prevent unwanted rotation. Two retaining tabs 102 are positioned to grip the sides of head 28 when the components are assembled.

It is preferable for the threaded shaft to be fixed (not able to rotate) when some other device is attached to it. In order to accomplish this objective, there are the general options of (1) locking the threaded shaft to the coupler so that by holding the coupler and/or anchor in place the rotation of the threaded shaft is prevented; or (2) allowing the threaded shaft to rotate with respect to the anchor, but providing features on the threaded shaft itself which allow the shaft to be gripped and held without destroying the threads. In FIG. 16, the two jam nuts are used to accomplish the second objective. One can also provide a pair of milled flats on the shaft. These can be cut into the threads themselves or—preferably—an enlarged journal can be provided which contains the gripping flats.

Figure 19:
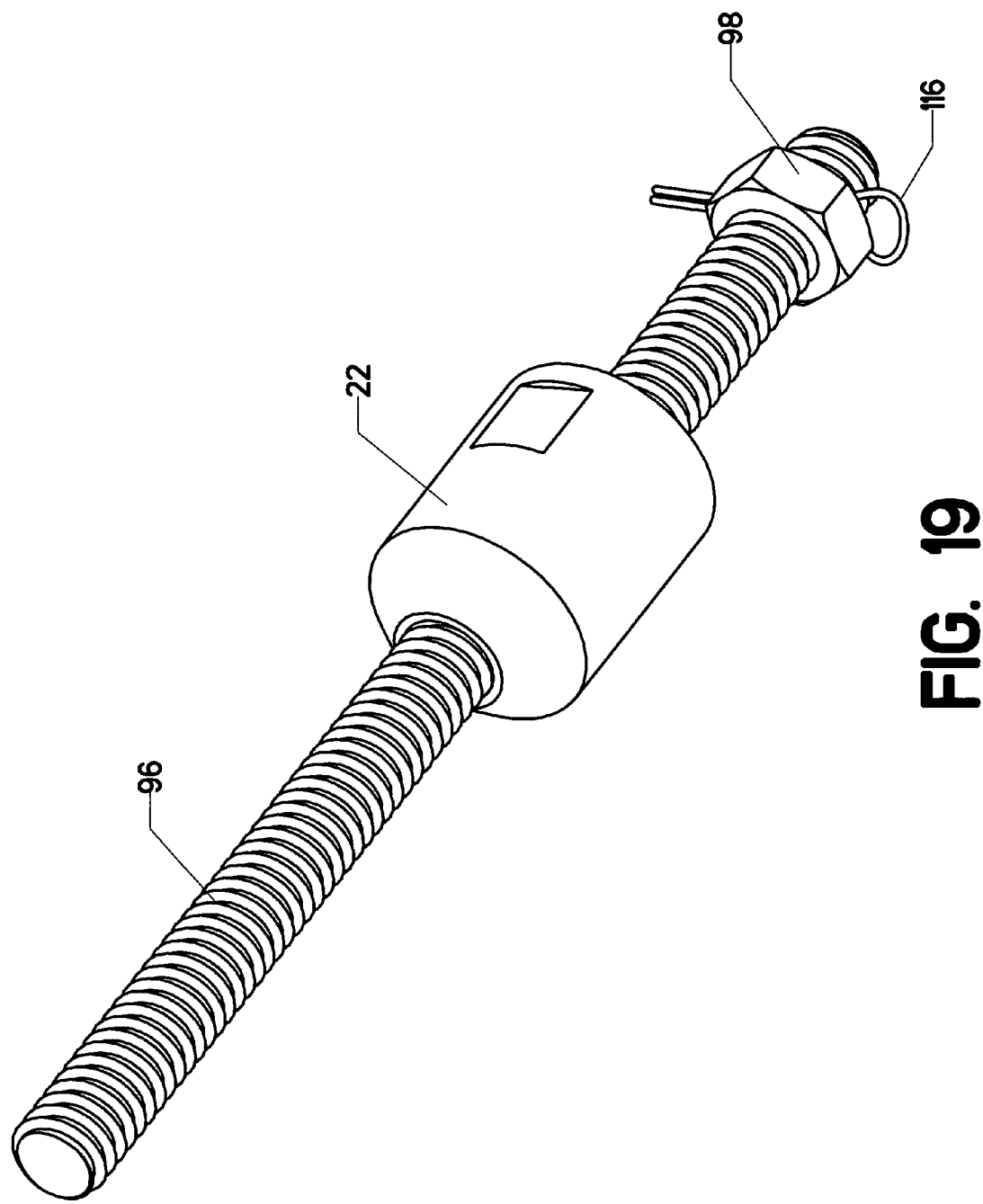
FIG. 19 is a perspective view, showing an alternate embodiment for the bolt used in the invention.

The bolts shown in most of the illustrations are made as a single unified piece—which is conventional in the art. However, the reader should not consider the term "bolt" to be limited to these embodiments, as there are many ways to create a device which operates as a bolt. FIG. 19 shows one example of such an alternative. In FIG. 19, threaded rod 96 has been passed through coupler 22 prior to the coupler being attached to an anchor 18. Nut 98 has been threaded onto the threaded shaft. The threaded shaft is then equipped with a device which prevents the nut from backing off the shaft. In this example, a cross bore is drilled through the threaded shaft and cotter key 116 is pushed through the cross bore. In the illustration the cotter key has not yet been deformed to hold the nut, but those skilled in the art will know that the cotter key can be bent around the shaft and compressed in order to fit inside coupler 22. The assembly of the threaded shaft, the nut, and the cotter key will then function as a bolt.

Finally, there are numerous permutations of the options presented which have not been described in detail. While it is impractical to illustrate every possible permutation, the reader will understand that the components described can be combined in many different ways. Accordingly, the scope of the present invention should thus be defined by the following claims rather than any specific examples given.

The invention claimed is:

1. A termination system for an end of a cable, comprising:
   a. an anchor, attached to said cable, wherein said anchor has a first end proximate said end of said cable and a second end proximate said cable but distal to said end of said cable;
   b. a coupler, including,
      i. a first side proximate said anchor,
      ii. a second side distal to said anchor,
      iii. an internal cavity,
      iv. a hole passing from said internal cavity out said second side;
   c. said coupler being attached to said anchor with said internal cavity of said coupler lying adjacent to said first end of said anchor;
   d. a bolt having a bolt head with six hexagonal flats, and a threaded shaft, wherein a portion of said threaded shaft passes through said hole in said coupler and extends beyond said coupler and away from said anchor, and said bolt head lies within said internal cavity in said coupler;
   e. said hole in said coupler being too small to allow said bolt head to pass; and
   e. wherein said coupler includes at least one wall in said internal cavity positioned to bear against one of said hexagonal flats on said bolt head, thereby preventing said bolt from rotating with respect to said coupler.

2. A termination as recited in claim 1, wherein said attachment between said coupler and said anchor comprises a threaded connection.

3. A termination as recited in claim 2, further comprising a spacer placed between said bolt head and said anchor.

4. A termination as recited in claim 1, wherein said at least one wall in said internal cavity forms part of a pocket sized to receive said bolt head.

5. A termination as recited in claim 1, wherein said anchor is attached to said cable by potting.

* * * * *